(12) United States Patent
Sharp et al.

(10) Patent No.: US 9,383,590 B2
(45) Date of Patent: *Jul. 5, 2016

(54) STEREOSCOPIC EYEWEAR WITH STRAY LIGHT MANAGEMENT

(71) Applicant: RealD Inc., Beverly Hills, CA (US)

(72) Inventors: Gary D. Sharp, Boulder, CO (US); David A. Coleman, Louisville, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/301,129

(22) Filed: Jun. 10, 2014

(65) Prior Publication Data

US 2014/0293418 A1 Oct. 2, 2014

Related U.S. Application Data

(63) Continuation of application No. 13/405,199, filed on Feb. 24, 2012, now Pat. No. 8,746,876.

(60) Provisional application No. 61/446,385, filed on Feb. 24, 2011.

(51) Int. Cl.
*G02C 7/12* (2006.01)
*G02B 27/26* (2006.01)
*G02C 7/16* (2006.01)
*G02B 1/11* (2015.01)
*G02C 13/00* (2006.01)

(52) U.S. Cl.
CPC ...... *G02B 27/26* (2013.01); *G02B 1/11* (2013.01); *G02C 7/16* (2013.01); *G02C 13/001* (2013.01); *Y10T 29/31* (2015.01)

(58) Field of Classification Search
CPC ............... G02B 27/0172; G02B 2027/0178; G02B 5/30; G02B 1/11; G02C 7/12
USPC ................................................ 351/49, 83, 41
See application file for complete search history.

(56) References Cited

U.S. PATENT DOCUMENTS

| 3,884,561 | A | 5/1975 | Kodys |
| 4,135,792 | A | 1/1979 | Deeg et al. |
| 4,744,633 | A | 5/1988 | Sheiman |
| 6,074,059 | A | 6/2000 | Glass et al. |
| 7,008,056 | B2 | 3/2006 | Hartley |
| 7,898,734 | B2 | 3/2011 | Coleman et al. |

(Continued)

OTHER PUBLICATIONS

International search report and written opinion of international searching authority of PCT/US2012/026654, dated Dec. 26, 2012.

(Continued)

*Primary Examiner* — Hung Dang
(74) *Attorney, Agent, or Firm* — Neil G. J. Mothew; Penny L. Lowry

(57) ABSTRACT

Disclosed embodiments relate to eyewear configured to reduce stray light. An exemplary embodiment of the eyewear accounts for various design factors, including the cross sectional profile of the rim, the micro topography of the rim surface, the reflectivity, the theater or room geometry, proximity of the eye to the lens, lens size, and the screen gain. An exemplary eyewear includes lenses connected to the rims of a frame, and a path may be defined through a maximum height of the outer flange portion of a rim and a maximum height of the inner flange portion of the rim section. The path may be inclined at an angle relative to an angle α relative to a longitudinal axis defined by the lenses.

20 Claims, 4 Drawing Sheets

(56) References Cited

U.S. PATENT DOCUMENTS

| | | | | |
|---|---|---|---|---|
| 8,746,876 B2 * | 6/2014 | Sharp | ............... | G02C 7/16 351/49 |
| 2007/0164950 A1 | 7/2007 | Tajiri | | |
| 2007/0188863 A1 | 8/2007 | Sun et al. | | |
| 2007/0200997 A1 | 8/2007 | Jannard et al. | | |
| 2010/0177173 A1 | 7/2010 | Arai | | |

OTHER PUBLICATIONS

U.S. Appl. No. 12/977,026, filed Dec. 22, 2010, entitled "Polarization Preserving Projection Screen with Engineered Pigment and Method for Making Same" by Joel Petersen (not provided as Examiner can retrieve from USPTO database).

U.S. Appl. No. 12/976,986, filed Dec. 22, 2010, entitled "Polarization Preserving Projection Screen with Engineered Pigment and Method for Making Same" by Gary D. Sharp (not provided as Examiner can retrieve from USPTO database).

U.S. Appl. No. 13/182,381, filed Jul. 13, 2011, entitled "Field-of-view compensated polarization switch for short throw 3D projection" by Gary D. Sharp (not provided as Examiner can retrieve from USPTO database).

* cited by examiner

STEREOSCOPIC EYEWEAR WITH STRAY LIGHT MANAGEMENT

CROSS-REFERENCE TO RELATED APPLICATION

This application relates and claims priority to commonly-assigned U.S. Provisional Patent Application No. 61/446,385, filed Feb. 24, 2011, entitled "Stereoscopic eyewear with stray light management," and to U.S. patent application Ser. No. 13/405,199, entitled "Stereoscopic eyewear with stray light management," filed Feb. 24, 2012, now U.S. Pat. No. 8,746,876 both of which are herein incorporated by reference in their entireties for all purposes.

TECHNICAL FIELD

This disclosure generally relates to addressing eyewear and more specifically relates to stereoscopic eyewear configured to reduce stray light from reaching the eye.

BACKGROUND

Stereoscopic systems operate by presenting two distinct images to a viewer. Filtering may be utilized to present one image to one eye and the second image to the other eye. Filtering may employ polarization or spectral-division methods to separate the two images. Spectacles (or eyewear) pass orthogonal polarization states to each eye and complete the filtering function.

SUMMARY

An embodiment of eyewear configured to reduce stray light comprises a frame having rim sections and lenses connected to the rim sections of the frame, each lens comprising a field of view (FOV) having a half angle $\theta_0$. Each rim section may comprise an outer portion and an inner portion, and a path may be defined through a maximum height of the outer portion and a maximum height of the inner portion, the path being inclined at an angle $\alpha$ relative to a longitudinal axis defined by the lenses.

Another embodiment of eyewear configured to reduce stray light comprises a frame having rim sections and lenses connected to the rim sections of the frame, each lens comprising a field of view (FOV) having a half angle $\theta_0$. Each rim section may comprise an outer flange portion and an inner flange portion, the outer and inner flange portions defining a channel therebetween. A portion of the each lens may be disposed in the channel of a respective rim section. A path may be defined through a maximum height of the outer flange portion and a maximum height of the inner flange portion, the path being inclined at an angle $\alpha$ relative to a longitudinal axis defined by the lenses. The maximum height of the outer flange portion may be greater than the maximum height of the inner flange portion and comprises a sloped profile from an outer edge to an inner edge of the outer flange, and the angle $\alpha$ may be greater than a steepest incidence angle associated with a screen.

Related methods for designing and manufacturing the eyewear of the present disclosure are also disclosed.

DETAILED DESCRIPTION

Figure 1:
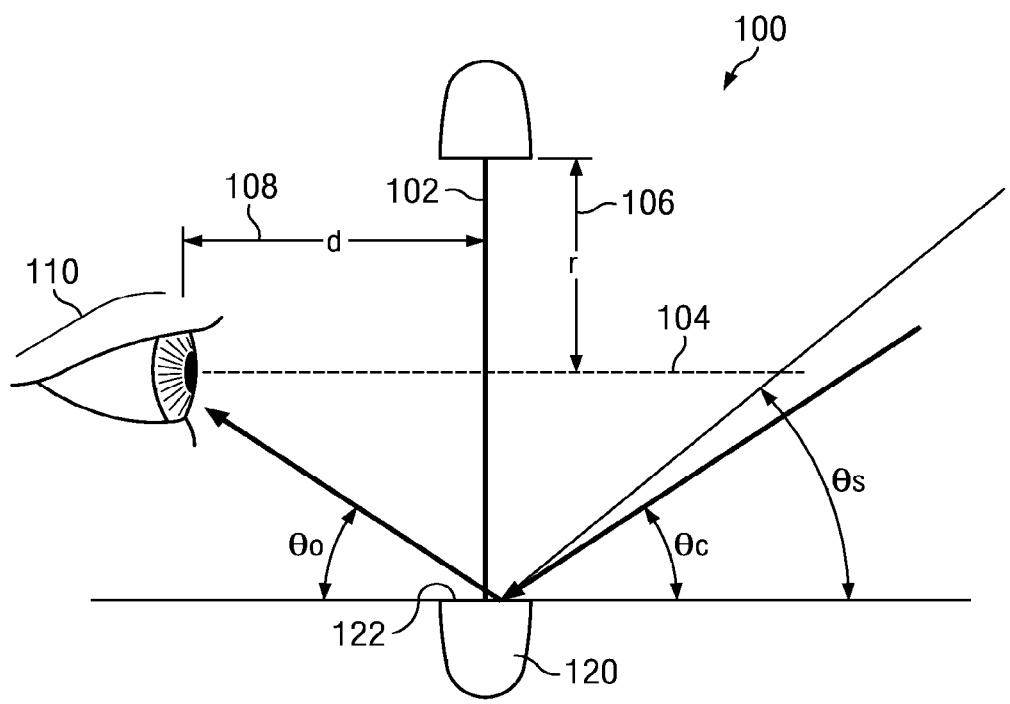
FIG. 1 illustrates a geometric model of a first exemplary embodiment of eyewear configured to reduce stray light, in accordance with the present disclosure.

When designing passive and active (shutter-glass) eyewear for stereoscopic 3D displays, an objective may be to provide the viewer an experience that is as close as possible to being eyewear-free. As such, any persistent reminder that the imagery is being viewed through eyewear should be eliminated wherever possible through design considerations. This includes minimizing bulkiness/weight, and designing the frame to maximize comfort. In some case, material cost may be a constraint. According to the present disclosure, optical performance may also be a design consideration. The present disclosure includes embodiments that consider the eyewear as an optic, which through several stray light generating mechanisms, may limit the quality of the experience.

According to the present disclosure, the design of the lens and frame may be such that the eye is comfortably focused in the plane of the image (typically the far-field), which is best accomplished under the following circumstances:

1. The lens is large enough, and in close enough proximity to the eye that the eyewear field of view (FOV) is substantially larger than the angular extent of the imagery;
2. The lens induces an imperceptible level of optical distortion; and
3. The stray light associated with every aspect of the eyewear is minimized.

In stereoscopic 3D cinema, the functional purpose of the eyewear is to decode the (stereo pair) imagery encoded at the projector. The effectiveness of this lock-and-key arrangement is typically measured at the system-level by extracting the relative leakage of the unintended image, given as a contrast ratio, or cross-talk. This test is typically made through the analyzer (eyewear lens material) using a photopically weighted detector. It is a point measurement, made with a narrow acceptance angle, typically along the path yielding the best-case contrast. Another measurement made by manufacturers of such equipment is to characterize the contribution of any encoding mechanism to loss in ANSI (checkerboard) contrast, which is typically done directly in front of the screen without eyewear. Neither of these tests captures loss in image quality due to any unintended characteristics of the eyewear, as experienced by an actual observer. This degradation is highly dependent upon optical design considerations of the eyewear, or lack thereof, ultimately determined by the degree of stray light control.

Stray light is taken to be any component of light that does not follow the intended path from the image generation device to the viewer. It can be the result of direct scatter from, for example, lens materials and adhesives (which may be associated with forward scatter, or haze), primary (surface/bulk) scatter from a frame element, or secondary scattering, as from skin/eye and subsequent frame elements. The present disclosure provides embodiments of 3D eyewear designs that may reduce or substantially eliminate such scatter, thereby enhancing the overall "see-through" and quality of the 3D experience.

As evidenced by prevalent 3D cinema eyewear designs (for example, by RealD, IMAX, Dolby, and Master Image), little attention is given to the frame as an optic that has important performance implications. As discussed above, performance measurements are made under highly controlled conditions along the intended optical path through the optics train. In reality, portions of the frame frequently act as secondary emission sources, directing stray light into the eye and compromising the overall visual experience. It should be noted that while stray light equally affects the quality of 2D content, specific relevance to 3D includes the fact that decoding eyewear is currently a necessity in non-autostereoscopic systems. The background light contributed by the eyewear is more relevant to loss in ANSI (checkerboard) contrast, versus ghost images associated with cross-talk.

According to an embodiment of the present disclosure, the eyewear frame may be configured to reduce or substantially eliminate reflection and scatter from entering the eye. In particular, light reflecting from the interior of the rim is often within the field of view (FOV) of the eye. The cross sectional profile of the rim, the micro topography of the rim surface, the reflectivity (which depends upon ray direction), the theatre geometry, the proximity of the eye to the lens, the lens size, and the screen gain (which determines relative strength of input rays versus angle), all play a role in determining the amount of light collected by the eye from the frame.

According to the present disclosure, the frame geometry may be designed to minimize the amplitude of primary scatter collected by the eye. This can be done by analyzing the theatre geometry, or viewing locus, which is derived by superimposing the field of observation for a range of audience viewing locations and extracting the perimeter. This optimization may exclude certain viewers, including, for example, extreme viewing locations in very short-throw ratios auditoriums, in the event that it creates tradeoffs in the optimization. In an exemplary embodiment, however, an optimized frame can satisfy the requirements for optimum viewing over the entire cinema ensemble.

A second-order consideration is the strength of scatter from a particular screen location, which can be highly dependent upon the geometry. A more detailed analysis incorporates a weighting function associated with various angle dependent elements. Factors that contribute to diminishing efficiency as a function angle include the projector, the screen, and the 3D shuttering mechanism (e.g. for sequential polarization systems). The latter may be either a mechanical or LC based polarization switch with suitable analyzing eyewear, or shutter glasses worn directly over the eye.

An objectionable aspect of many current polarization-based 3D theatre systems is that the image brightness may diminish rapidly from the screen center to the screen corners. A DLP projector may show a 10-20% fall-off in image brightness. A polarization preserving screen may show more than an 80% drop in gain in the corners, and a liquid crystal (LC) based polarization switch may show a 20-30% drop in brightness, as observed through the analyzing eyewear. As these limitations are removed (see co-pending commonly-owned patent and applications, including U.S. Pat. No. 7,898,734, and U.S. patent application Ser. Nos. 12/977,026, 12/976,986, and Ser. No. 13/182,381, all of which are herein incorporated by reference in their entireties,), image brightness can increase several fold at the extreme viewing angles, greatly improving the image quality, but potentially exacerbating the stray light contribution from eyewear scattering events. This occurrence in the industry will increase the need for the inventive eyewear, which precisely manages light incident on the eyewear from extreme angles.

Typically, eyewear frames may be made using an injection molding process, with molds manufactured using conventional (CNC) machining, or electronic discharge machining (EDM). The micro-topography of the mold surface may depend both upon the intrinsic characteristics of the process, as well as any subsequent steps to modify the surface. For instance, random texture can be added by attacking the surface chemically, or mechanically, using various methods. Conversely, polishing steps can be incorporated to improve the smoothness of the surface. The frames may be manufactured by injecting a molten polymer into a mold cavity, followed by a cooling step, and releasing the part from the mold. Conventional polymers used for eyewear frames may include Acrylonitrile butadiene styrene (ABS), Polycarbonate (PC), and other polymers and co-polymers. The resulting frame is substantially conformal to the mold even at optical scales, so the micro-topography of the mold can determine the surface finish.

An eyewear frame that is uniform on an optical scale tends to produce stray light that is highly directional when it is illuminated. Like any specular reflection, the direction of the outgoing ray is determined by the input direction and the local surface normal. Such an interaction obeys Fresnel's equations for reflection at the air/polymer interface. To the extent that at least portions of the frame surface direct rays scattered from a location of the viewing screen into the field of view, the quality of the 3D experience may be compromised by the associated stray light. Among other things, the distribution of light within the visual FOV is highly dependent upon the specific geometry of the eyewear rim. For instance, a rim may have a flat facet portion that steers incident light from an illumination direction into the FOV. One such example is a goggle-like pair of IMAX cinema eyewear, which has a flat rim (substantially normal to the lens material), with a total depth of approximately 10 mm. Light reflected from such a large rim can create the perception that the imagery is being viewed through a ring illuminator. Furthermore, the intensity of this stray light is highly dependent upon image content. Specifically, light specularly reflected from a rim facet that is captured by the eye can originate from a small region (likely near the edge) of the cinema screen. In such a case, the stray light may create the additional distraction that it is temporally modulated.

As an alternative to a faceted rim, a rim may have a more rounded contour that can locally approximate a cylindrical reflector. Such a surface will spread an incident ray in one dimension over a range of angles dictated by the radius of curvature. While this suppresses the contribution from a single direction, as in the former case, in this instance the eye can capture light from a larger area of the emitting surface. That is, the distribution of scatter into a broader range of angles increases the probability that the eye will capture light from a greater area of the rim surface.

A more extreme situation may exist when the frame topography maps an input ray to a random distribution of outgoing rays. Again, the distribution further depends upon the frame contours, or surface-normal distribution. Surfaces with random or deterministic textures have the tendency to scatter light into a broader distribution of angle space, as is frequently characterized by the bi-directional reflectance distribution function (BRDF). The BRDF is the differential reflectivity of the surface per solid angle. Highly textured surfaces, such as those accurately approximated as a Lambertian scatterer, have the benefit of dispersing the stray light broadly in angle space and eliminating the "hot spot", though the ability to control stray light from such statistical surfaces is more challenging.

In certain instances, frames are manufactured with a matte finish, for appearance and (perhaps erroneously) for functional purposes. Functionally, a matte surface disperses the specular component of reflection, and depending upon the specific texture, can potentially have a lower total integrated scatter (TIS) than a smooth surface composed of the same material. The TIS is defined as the ratio of total power propagating away from the scattering surface, to that incident upon it. Some reduction in TIS can be achieved through multiple lossy scattering events. However, because average reflectivity can increase with incidence angle, the slope probability statistics of the surface are an important factor. Matte surfaces are typically Gaussian random noise based, with aspect ratio (mean in-plane feature size to mean height) having significant influence on the probability of multiple scattering events. Textured surfaces that significantly reduce TIS are desirable, but it is difficult to suppress stray light to an imperceptible level. Nevertheless, engineered surfaces that manipulate the BRDF, such that scatter from the frame surface is not directed to the eye from a representative range of illumination directions, are considered embodiments of the present disclosure.

The reflection efficiency of a ray incident on an optically smooth surface depends upon the refractive index of the polymer, the incidence angle, and the state of polarization (SOP), in accordance with Fresnel's equations for reflection. The direction of the reflected ray depends upon the input ray direction and the local surface normal, defining the local specular direction. If the surface is rough, the situation is more complex. Here, the distribution of scatter about the specular direction also depends upon the incidence angle and the surface topography, which is captured by the BRDF. What has not been considered thus far is the relatively strong component transmitted into the bulk polymer medium.

For a typical polymer at a moderate incidence angle, the transmission of unpolarized light into the bulk can exceed 90%. As such, it is highly desirable that the frame design carefully manages the transmitted component. The degree to which light transmitted into the polymer scatters into the observation direction depends upon the detailed molecular structure of the medium, which can produce refractive inhomogeneity, as well as the interaction length with the bulk. Bulk scatter, and the wavelength dependence with which light propagates into the polymer medium, determines the color and brightness of the frame material. Frequently, 3D eyewear frames utilize polymers that either have low intrinsic visible transmission or that contain additives, such as black dyes or carbon black. This has the desired effect of minimizing the interaction length of light in the medium at all visible wavelengths, thus attenuating this particular contribution to stray light. While there may be no specific concern that bulk scatter from the frame contributes to observed stray light, a desirable approach is to minimize it. Since the angular distribution of bulk scatter in many polymers tends to be broad, strong absorbers can virtually eliminate the transmitted component before it can scatter significant power. However, while this makes a compelling case for utilizing low transmission materials for 3D eyewear, there may be instances where an alternative solution is desired.

The present disclosure also includes light control frame designs that do not require high visible absorption (black) frame material. For example, a frame material can even be fabricated of a transparent polymer, provided that light transmitted into the polymer material is not re-directed to the eye via one or more scatter events. This can be challenging, even in the cinema environment, when considering light incident on the rim portion of the frame. Here, a thin absorbing coating, or a second opaque piece may be utilized to aperture the lens and eliminate stray light in this specific portion of the frame. Alternatively, as an example, an opaque mask can be coated/deposited directly onto the lens material prior to die-cutting the lens from the sheet stock.

Also according to the present disclosure, frame designs are provided that minimize the contribution of the surface scatter component of stray light, thus maximizing the lens "see-through" and contrast of the 3D experience. Optimum frame designs are tailored to the specific use environment. In particular, optimized frame designs take into consideration the direction with which light is incident upon the frame from various light sources. Such environments may include a cinema auditorium, a museum, a theme-park ride, a home theatre, a living room (which may contain background illumination sources from multiple locations), a computer gaming environment, or an industrial setting.

A cinema environment is one in which ambient lighting is relatively controlled. It is reasonable to assume in this type of environment that the front projection screen is the dominant source for generating primary, and even secondary stray light components of significant amplitude. A primary scattering event is one that connects a location of the screen (or image source) to the eye via a single interaction with a frame surface element.

A secondary scattering event is one that connects a location of the screen to the eye via two scattering events, including (e.g.) a reflection from the viewer's face (and eye) to the interior surface of the lens or frame. In this particular case, the reflection from the face contains both surface and bulk scatter elements, while the second event is the combined specular reflection of this light from the front and back surfaces of the lens element. While there is little that can be practically done to attenuate the reflection from skin and eyes, the reflection from the lens can be reduced by using anti-reflection (AR) coatings.

In a linear polarization based system, using typical hard-coated triacetate (TAC) polarizer (and assuming that the light scattered from skin is substantially unpolarized), the reflection from the inner surface of the polarizer is approximately 4%, while that from the outer surface is approximately halved due to the action of the linear polarizer. This gives a combined reflection from the lens of approximately 6%, wherein roughly 6% of light scattered from the skin/eyes in the first pass is returned by the lens to the viewer. In order to eliminate this reflection, it is desirable to apply AR coatings to both the interior and exterior of the lens.

In a circular polarizer based system, the reflection from the inner surface of the polarizer is again approximately 4%. There is negligible reflection at the polarizer/QW (quarter-wave retarder) interface. As before, the polarizer halves the transmitted power, with 4-5% of the remaining light reflected at the exterior (PC) QW/Air interface. However, note that the round-trip of the QW converts the linear polarization to the orthogonal polarization, with this component subsequently absorbed by the analyzer. According to an embodiment of the present disclosure, AR coatings may only be applied to the interior surface of the lens to eliminate the secondary reflection term, while maintaining low cost. Further cost reduction can be achieved by applying AR coatings to an inexpensive Polyethylene terephthalate (PET) substrate using a roll-to-roll process. This substrate may be laminated using Pressure Sensitive Adhesive (PSA) to the linear polarizer, and can even potentially replace a TAC protective film on the linear polarizer. This assumes that issues, such as differences in mechanical properties of the substrates, are not an issue (e.g. issues causing curl). Because the polarization is already analyzed, the anisotropy of the PET substrate is not an issue.

AR coatings are a viable option for reducing the effects of secondary reflection on polarization based 3D eyewear. However, to the extent that the lens requires high reflectivity (e.g. dichroic-filter based spectral division stereo systems offered by Dolby), this is not the case. Since greater than half of the visible spectrum is reflected by each lens in such systems, secondary reflections are extremely strong. A compelling demonstration is as follows: observe a bright (point) light source in a dark room through Dolby glasses. When focusing in the near field, a very strong image of the viewer's eye/face, due to secondary reflection, is clearly observable that is fundamentally coupled to the image source. In practice, where the viewer is focused in the far-field, this light represents a distracting background source that detracts from the 3D experience. This is an intrinsic limitation of such systems when using reflecting filters.

According to an exemplary embodiment, an optimized frame of the present disclosure is one that has near zero primary reflection, or at least at a negligible level (<1 part in 1,000), for all viewing locations. This may be accomplished by engineering the frame local surface normal, such that there is no path connecting a screen location to the eye through a single surface scatter (or specular reflection) event. In view of the various design considerations discussed above, exemplary embodiments for eyewear with reduced stray light will be discussed below with respect to FIGS. 1-7.

FIG. 1 is a schematic diagram illustrating a one-dimensional analysis of the geometry of a single-facet (optically smooth) model for the eyewear frame. In the illustrated embodiment, the theatre geometry is such that light is incident on the lens 102 from the screen (not shown) over a range of angles encompassing the lens normal 104, to an extreme screen perimeter angle of θs. Assume a simple model for the eyewear, where the half-angle θo for the FOV of the lens is given by $$\theta_0 = \tan^{-1}[r/d]$$

where r is the lens radius 106, and d is the distance 108 from the eye 110 to the lens 102.

Figure 2:
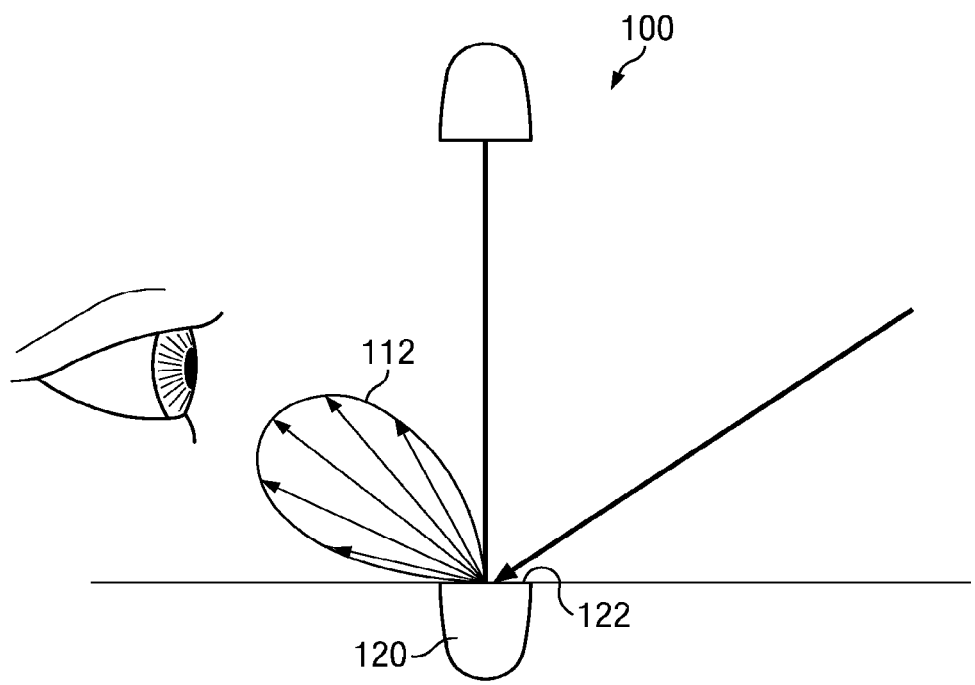
FIG. 2 illustrates specular reflections in the first exemplary embodiment of the eyewear shown in FIG. 1, in accordance with the present disclosure.

FIG. 2 is a schematic diagram of the frame 100 shown in FIG. 1 and provides an illustration of the out-going specular reflection rays 112 from the rim 120 towards the eye 110. Some of the specular reflection rays 112 are within the FOV while others may be outside of the FOV. Referring back to FIG. 1, in the event that a critical incidence angle θc≤θs exists, there is a corresponding specular reflection of the rim 120 within the FOV. Depending on the orientation of the facet 122 of the rim 120, different amount of specular reflection may be achieved. In a first case, if the facet normal is parallel to the lens 102 as shown in FIGS. 1 and 2, the critical angle θc is exactly the lens FOV, or θc=θo. So if θs>θo, there is a specular reflection of the rim 120.

Figure 3:
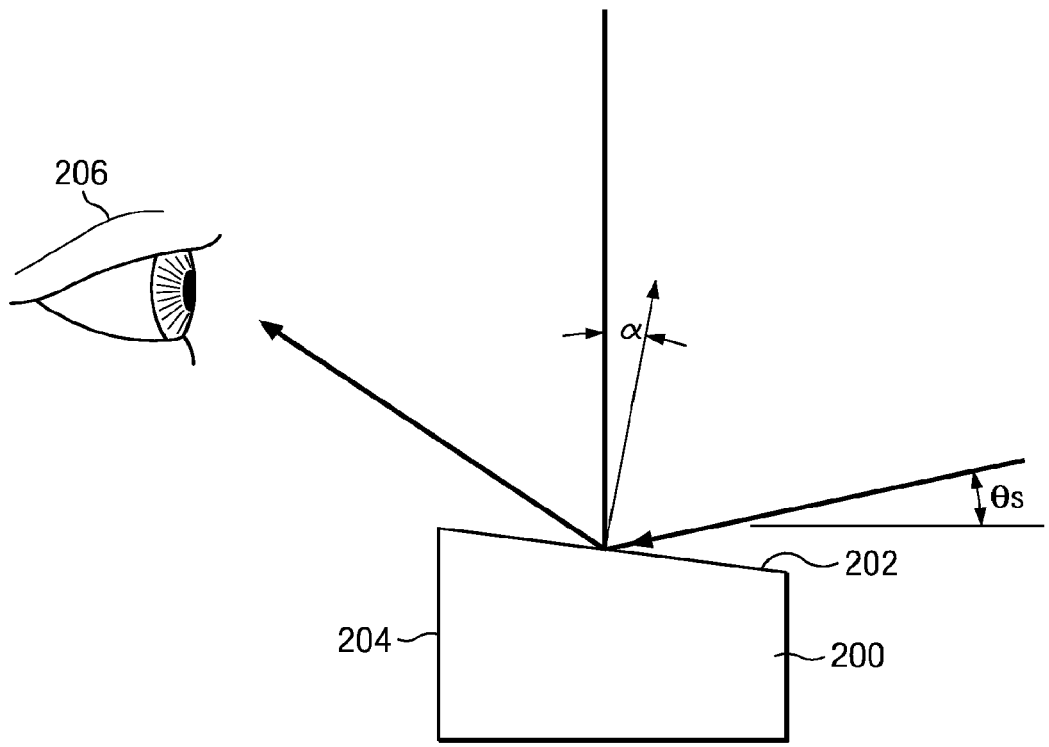
FIG. 3 illustrates a geometric model of a second exemplary embodiment of eyewear configured to reduce stray light, in accordance with the present disclosure.

FIG. 3 is a schematic diagram showing a rim 200 having a facet 202 tipped outwardly by angle α<0. Using the same model considered in FIG. 1 except replacing the rim 120 with the rim 200, the critical angle θc is reduced to θo−2|α|, which further increases the probability that the specular reflection angle is within the capture angle of the screen. If the facet 202 is further tipped outward until |α|>θo, the inner portion 204 of the rim 200 blocks the incident light, and there exists no specular reflection from the facet 202 to the eye 206 for any incidence angle. The embodiment of FIG. 3 is a desirable embodiment if |α|>θo.

Figure 4:
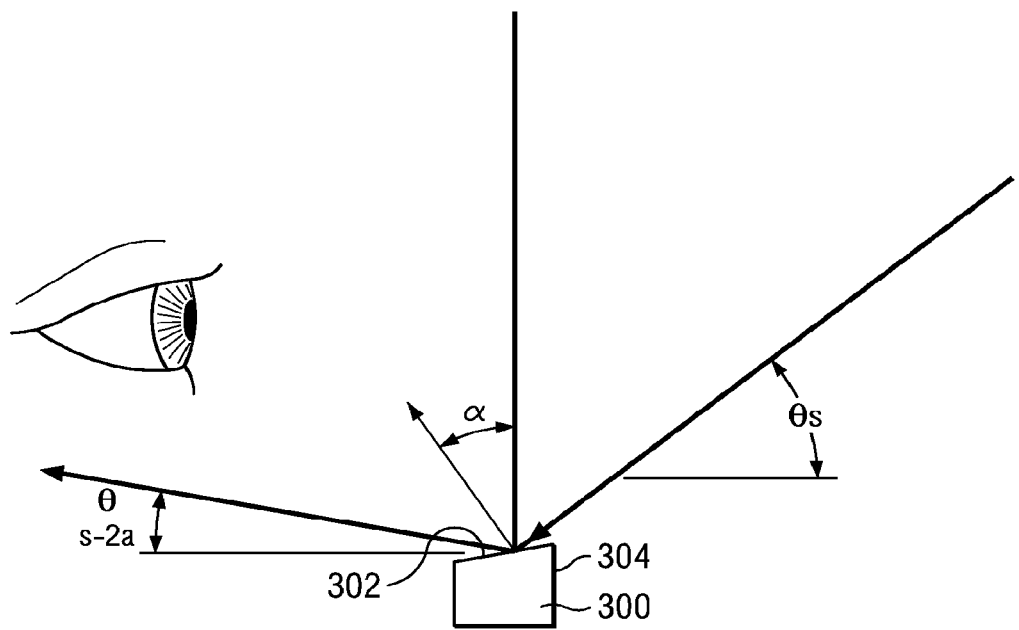
FIG. 4 illustrates a geometric model of a third exemplary embodiment of eyewear configured to reduce stray light, in accordance with the present disclosure.

FIG. 4 is a schematic diagram showing a rim 300 having a facet 302 tipped inwardly by angle α>0. Using the same model considered in FIG. 1 except replacing the rim 120 with the rim 300, the critical angle θc is increased to θo+2|α|, which reduces the probability that the specular reflection angle is within the capture angle of the screen. In a number of embodiments, a modest inward tip is sufficient to insure that no specular reflection is within the capture angle of the screen. As the facet 302 is further tipped inward, such that α≥θs, there ceases to be any reflection from the facet 302, as it is completely shadowed by the outer portion 304 of the rim 300. As such, the embodiment of FIG. 4 is a desirable embodiment.

The above is a simple illustration of how the rim geometry can affect the light stray light at the eye. A practical embodiment of the present disclosure is illustrated in FIG. 5A. FIG. 5A shows a cross-section of a frame 400 comprising rim 402, and the attachment of a lens 404 to the rim 402. In the illustrated embodiment, the lens 404 is clamped between inner and outer portions 406, 408 of the rim 402. In one embodiment, the outer portion 408 has a flange portion 410 that holds the lens 404. Similarly, the inner portion 406 has a flange portion 412 that holds the lens 404. In an exemplary embodiment, the inner and out portions 406, 408 may be modularly attached and may form a channel 414 that holds the lens 404 in place. A path may be defined through a maximum height 416 of the outer portion 408 and a maximum height 418 of the inner portion 406 such that the path is inclined at an angle α relative to a longitudinal axis 420 defined by the lenses. In the illustrated embodiment, the maximum height 416 of the outer portion 408 is greater than the maximum height 418 of the inner portion 406. This configuration corresponds to the inward tipping model shown in FIG. 4. In such an embodiment, the angle α may be greater than a steepest incidence angle θs associated with a screen. To avoid a facet that can steer light to the eye, the outer portion 408 may have a sloped or curved profile from an outer edge 430 to an inner edge 432 of the outer portion 408 as shown in FIG. 5.

Figure 5B:
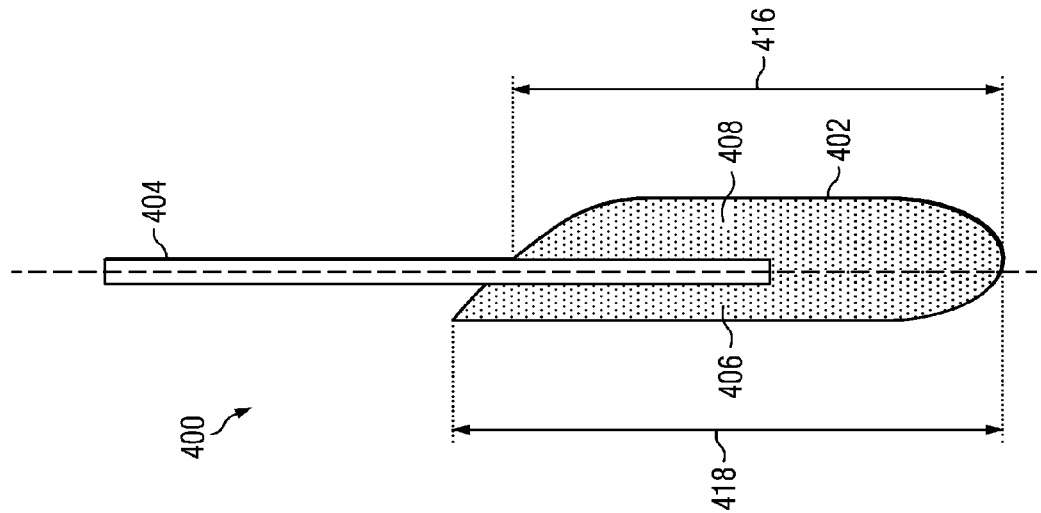
FIG. 5B illustrates another exemplary embodiment of eyewear having reduced stray light, in accordance with the present disclosure.
Figure 5A:
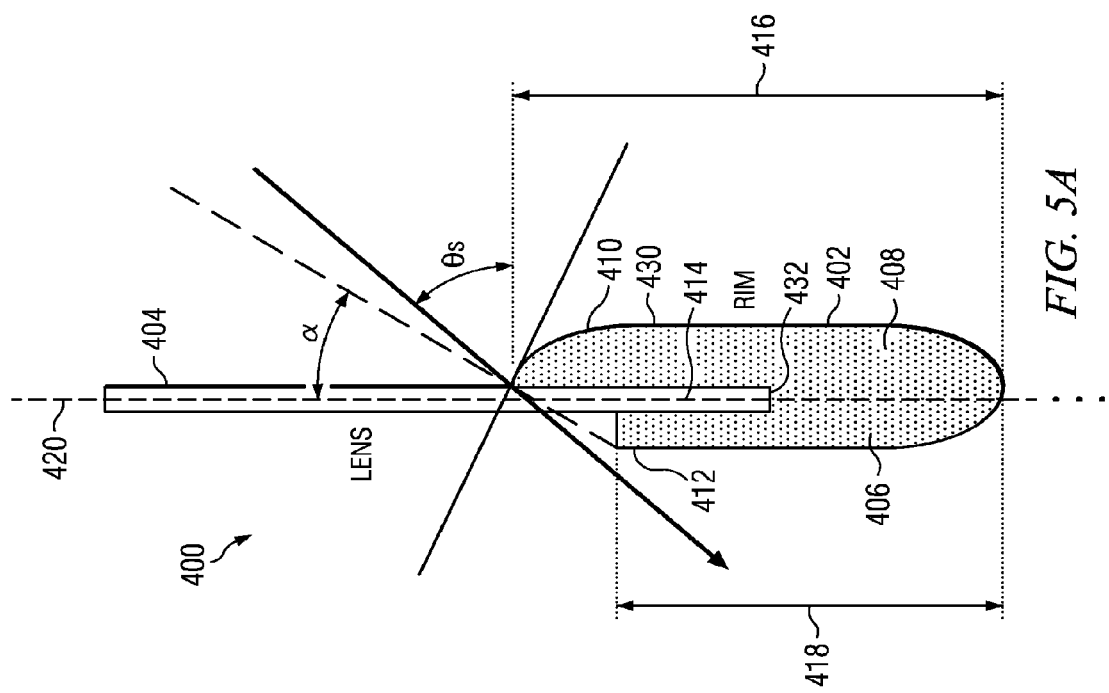
FIG. 5A illustrates an exemplary embodiment of eyewear having reduced stray light, in accordance with the present disclosure.

Another practical embodiment is illustrated in FIG. 5B. FIG. 5B shows a cross-section of a frame 400 comprising rim 402, and the attachment of a lens 404 to the rim 402. In the illustrated embodiment, the lens 404 is clamped between inner and outer portions 406, 408 of the rim 402. The maximum height 416 of the outer portion 408 may be smaller than the maximum height 418 of the inner portion 406, which would correspond to the outward tipping model shown in FIG. 3. In such an embodiment, the angle α may be greater than the half angle $\theta_0$ of the FOV (not shown). To avoid a facet that can steer light to the eye, the inner portion 406 may have a sloped or curved profile from an outer edge to an inner edge of the outer portion, similar to the sloped profile of the outer portion 408 in FIG. 5A.

Another potential source of stray light is from the front of the temple piece and the attachment point (or hinge) between the frame pieces. This can also be within the peripheral FOV, having a relatively large surface area, and thus can contribute significant stray light. As with the rim portion, while there may be no specular path from screen to the eye, due to relatively large angles involved, there can be a significant contribution from surface texture and bulk scatter.

There are numerous examples of 3D cinema frame designs of the prior art that incorporate large surface area temples and deep rim panels, presumably to help manage stray light. The approach seems to be that enclosing the volume containing the eye is needed to reduce the ambient level. While light can reach the viewer from extreme angles via scatter from the auditorium walls and ceiling and adjacent viewers, it is a relatively weak contributor to stray light. In a cinema environment, the dominant source of stray light follows the path directly from screen to viewer. As such, large surface side panels actually have the opposite effect of increasing stray light via scatter from the interior. Moreover, designs often incorporate matte finishes for such surfaces. Given that this surface is in the periphery or outside of the specular collection angle, this only increases the probability that light is scattered into the FOV. The present disclosure teaches an opposite solution for a cinema environment, wherein light is either absorbed or re-directed in a deterministic fashion, to minimize the local ambient light level.

According to an embodiment of cinema eyewear, the interior surfaces of the temple region are designed to minimize scatter collected by the eye. Some techniques that are beneficial for accomplishing this are as follows: 1) minimize the surface area of the frame (temple) interior; 2) use a surface finish that is substantially smooth to minimize random scatter within the FOV; 3) use a material with high visible absorption; and 4) if possible, provide light control structures on surfaces, which further re-direct light outside of the FOV.

Figure 6:
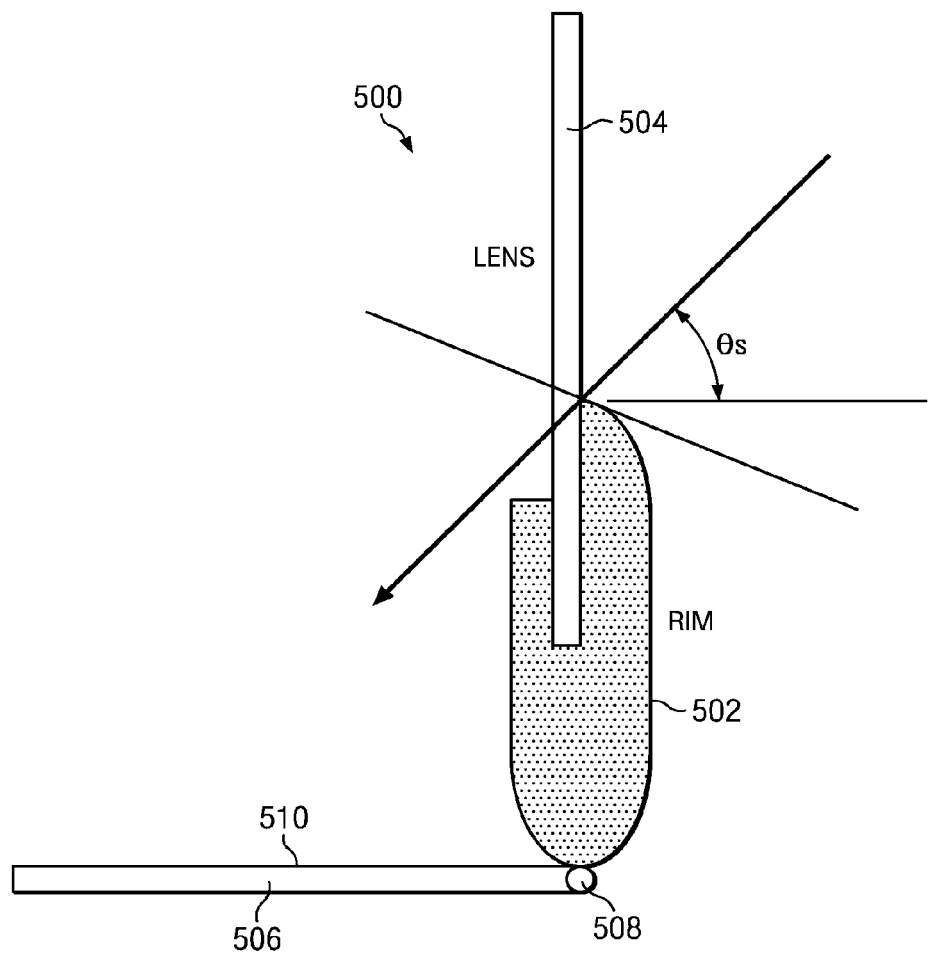
FIG. 6 illustrates another exemplary embodiment of eyewear having reduced stray light, in accordance with the present disclosure.

FIG. 6 shows a frame comprising 500 comprising a rim section 502, lens 504 secured in the rim section 502, and a temple portion 506 connected to the rim section 502 via an attachment portion 508. Large surface area parts, such as the temple and attachment point (or hinge) 506, 508 may be manufactured with light-control structures such as locally planar tilted surfaces 510 on the temple and/or attachment point 506, 508. Specular reflections from such structures, whether single or double, may occur in such a way that outgoing rays are directed outside of the field of view. For instance, periodic structures, similar to those used in LCD light control films (as manufactured by e.g. 3M under the Vikuity trade name) can be designed such that incoming rays reflect from locally planar tilted surfaces. A ray incident from the screen is either directly reflected outside of the FOV or undergoes a secondary reflection from the structure before leaving the system. In either case, the structure angularly filters the light incident on the surface in such a way that no light is steered to the eye.

When designing eyewear for home use, the situation can be substantially different than in the cinema. Unless it is a home-theatre setup, which is light controlled much like the cinema, stray light can be introduced from a number of illumination sources. However, the image source remains an important contributor to stray light, and as such, many of the above design principles continue to apply.

The situation is more complicated in (e.g.) a home 3D system situated in a living room. Here, there can be several background illumination sources, incident from various angles. The frame design may incorporate light shielding via panels that enclose the space between the lens and face in an attempt to block light introduced from extreme angles. To the extent that such panels are used, it is preferred that matte inner surfaces are not used. Rather, deterministic (e.g. periodic louvers) structures that angularly filter light introduced from both the screen and other ambient sources are desirable.

Figure 7:
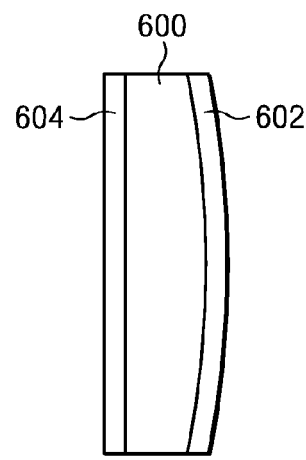
FIG. 7 illustrates an exemplary lens designed to reduce stray light, in accordance with the present disclosure.

Additionally, anti-reflective (AR) coatings may desirably be used in home use eyewear. In that case, simple specular surface for the side shields would cause the face to be illuminated. Light scattering off of the face may then go back out through the lens (even by way of a specular reflection off of the frame). In fact, because the face is illuminated much more brightly from the screen, it seems much more difficult to engineer a baffled surface that prevents both this component the screen component from hitting the eye. Accordingly, a simple specular surface in combination with an AR may provide a desirable embodiment well suited to the home environment. FIG. 7 illustrates an exemplary lens 600 having an AR coating and operable to be incorporated into any embodiment disclosed herein. The lens 600 includes a first anti-reflective coating 602 being disposed on an exterior surface of the lens 600, and a second anti-reflective coating 604 being disposed on an interior surface of the lens 600.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. Stereoscopic eyewear configured to reduce stray light, the eyewear comprising:
   a frame having rims; and
   lenses, comprising:
   a first lens operable to allow a first state of polarization (SOP) of light to pass through the first lens and operable to block a second SOP of light from passing through the first lens and a second lens operable to block the first SOP of light from passing through the second lens and operable to allow the second SOP of light to pass through the second lens,
   wherein the lenses are connected to the rims of the frame, and each rim comprises an outer portion and an inner portion; further wherein the rims are tipped inwardly so that the outer portion of the rim shadows the inner facet of the rim;

further wherein the lenses each comprise at least one anti-reflective coating.

2. The stereoscopic eyewear of claim 1, wherein the lenses each comprise a plurality of anti-reflective coatings, a first anti-reflective coating being disposed on an exterior surface of each lens, and a second anti-reflective coating being disposed on an interior surface of each lens.

3. The stereoscopic eyewear of claim 1, wherein the at least one anti-reflective coating being disposed on the interior surface of the lens.

4. The stereoscopic eyewear of claim 1, wherein the at least one anti-reflective coating being disposed on the exterior of the lens.

5. The stereoscopic eyewear of claim 1, wherein the lenses further comprise a quarter wave layer on the exterior of the lenses.

6. The stereoscopic eyewear of claim 5, wherein the quarter wave layer is the anti-reflective layer of the lenses.

7. The stereoscopic eyewear of claim 6, wherein the at least one anti-reflective coating being disposed on the interior surface of the lens.

8. Stereoscopic eyewear configured to reduce stray light, the eyewear comprising:
a frame having rims; and
lenses connected to the rims of the frame, each lens comprising:
a first lens operable to allow as first state of polarization (SOP) of light to pass through the first lens and operable to block a second SOP of light from passing through the first lens and a second lens operable to block the first SOP of light from passing through the second lens and operable to allow the second SOP of light to pass through the second lens;
wherein each rim comprises an outer flange portion and an inner flange portion, the outer and inner flange portions defining a channel therebetween;
wherein a portion of each lens is disposed in the channel of a respective rim;
wherein the maximum height of the outer flange portion is greater than the maximum height of the inner flange portion and comprises a sloped profile from an outer edge to an inner edge of the outer flange; and
wherein the lenses each comprise at least one anti-reflective coating.

9. The stereoscopic eyewear of claim 8, wherein the lenses each comprise a plurality of anti-reflective coatings, a first anti-reflective coating being disposed on an exterior surface of each lens, and a second anti-reflective coating being disposed on an interior surface of each lens.

10. The stereoscopic eyewear of claim 8, wherein the at least one anti-reflective coating being disposed on the interior surface of the lens.

11. The stereoscopic eyewear of claim 8, wherein the at least one anti-reflective coating being disposed on the exterior of the lens.

12. The stereoscopic eyewear of claim 8, wherein the lenses further comprise a quarter wave layer on the exterior of the lenses.

13. The stereoscopic eyewear of claim 12, wherein the quarter wave layer is the anti-reflective layer of the lenses.

14. The stereoscopic eyewear of claim 13, wherein the at least one anti-reflective coating being disposed on the interior surface of the lens.

15. A method of manufacturing stereoscopic eyewear configured to reduce stray light, the method comprising:
forming a frame having rims; and
disposing lenses in the rims of the frame, the lenses comprising:
a first lens operable to allow a first state of polarization (SOP) of light to pass through the first lens and operable to block a second SOP of light from passing through the first lens and a second lens operable to block the first SOP of light from passing through the second lens and operable to allow the second SOP of light to pass through the second lens;
wherein each rim comprises an outer portion and an inner portion, wherein the rim is tipped inwardly so that almost no specular reflection is within the capture angle of the screen and the outer portion of the rim shadows the facet of the rim;
further wherein the lenses each comprise at least one anti-reflective coating.

16. The stereoscopic eyewear of claim 15, wherein the lenses each comprise a plurality of anti-reflective coatings, a first anti-reflective coating being disposed on an exterior surface of each lens, and a second anti-reflective coating being disposed on an interior surface of each lens.

17. The stereoscopic eyewear of claim 15, wherein the at least one anti-reflective coating being disposed on the interior surface of the lens.

18. The stereoscopic eyewear of claim 15, wherein the at least one anti-reflective coating being disposed on the exterior of the lens.

19. The stereoscopic eyewear of claim 16, wherein the lenses further comprise a quarter wave layer on the exterior of the lenses.

20. The stereoscopic eyewear of claim 19, wherein the quarter wave layer is the anti-reflective layer of the lenses.

* * * * *